June 3, 1958  J. B. CARTER  2,836,868
SAFETY STRAP BUCKLE
Filed Dec. 5, 1955  2 Sheets-Sheet 1
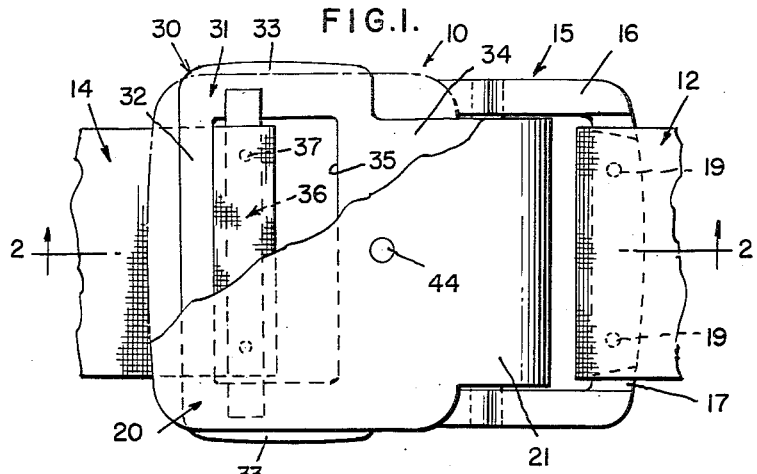
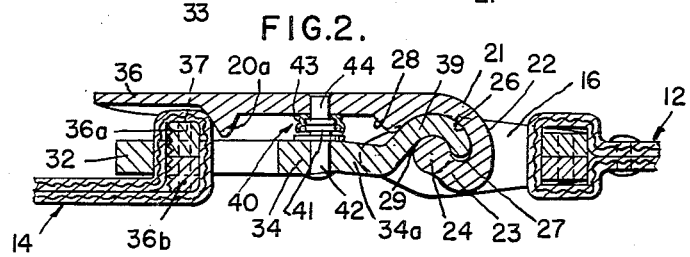
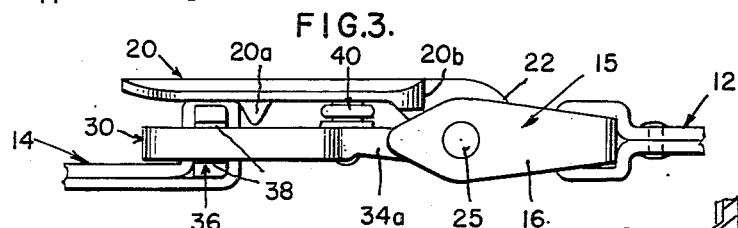
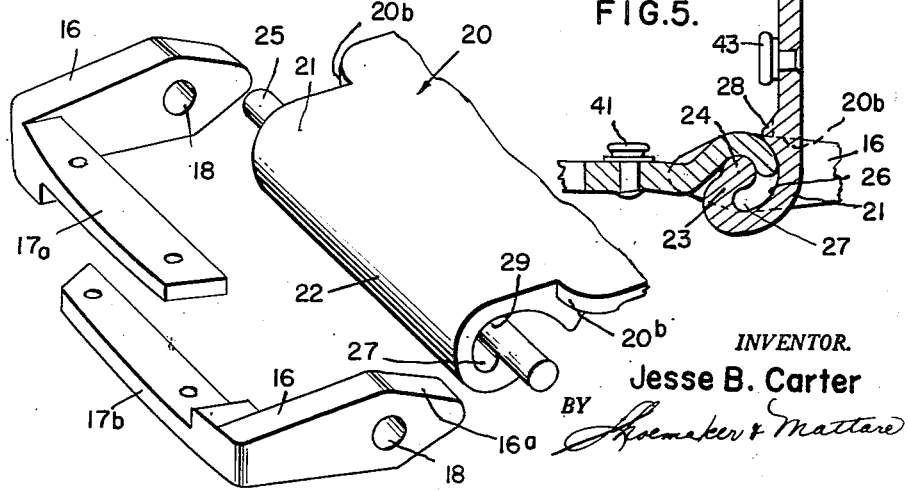
INVENTOR.
Jesse B. Carter
BY
*Shoemaker & Mattare*
ATTYS June 3, 1958 J. B. CARTER 2,836,868
SAFETY STRAP BUCKLE
Filed Dec. 5, 1955 2 Sheets-Sheet 2
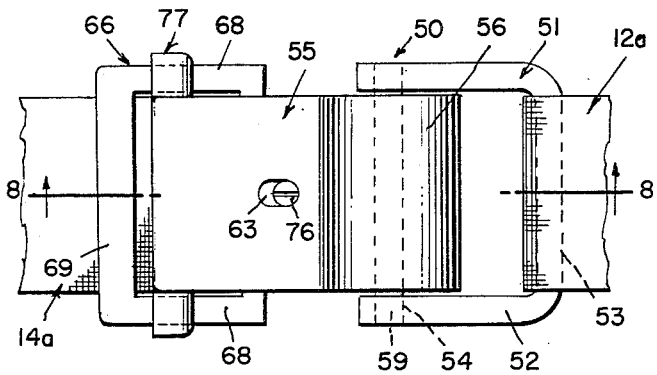
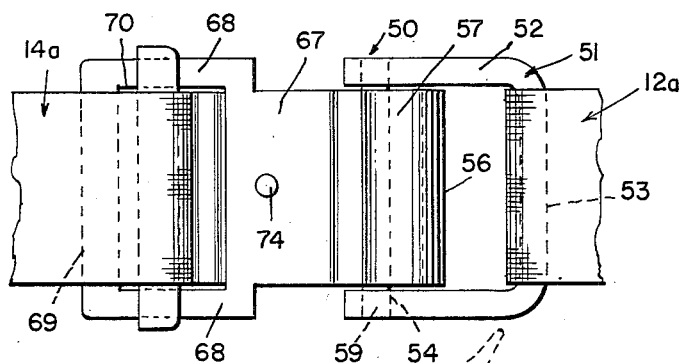
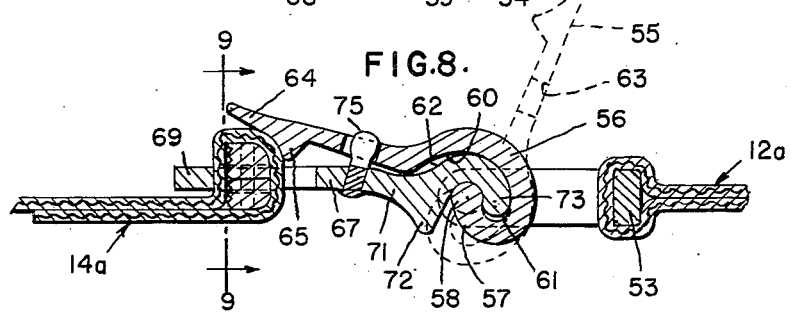
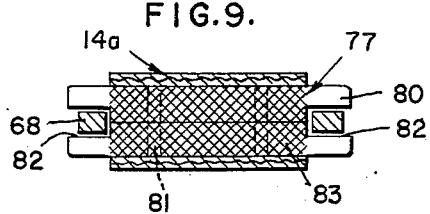
INVENTOR.
Jesse B. Carter
BY
ATTYS

United States Patent Office 2,836,868
Patented June 3, 1958

2,836,868

SAFETY STRAP BUCKLE

Jesse B. Carter, Pittsford, N. Y., assignor to Hickok Manufacturing Co. Inc., Rochester, N. Y., a corporation of New York Application December 5, 1955, Serial No. 550,912

10 Claims. (Cl. 24—77)

This invention relates generally to the class of buckles and is directed particularly to improvements in buckles designed primarily, though not necessarily exclusively, for use with safety belts such as are used in airplanes, automobiles and the like.

The use of safety belts or safety straps in all types of passenger carrying conveyances such as automobiles, airplanes and the like, is becoming increasingly more important, particularly in connection with passenger motor vehicles. It has been found by observation and experiments that the number of fatalities resulting from motor vehicle accidents is greatly reduced in those cases where the vehicle occupant is restrained in some manner against free forward movement when the motor vehicle comes to a sudden stop and accordingly there are coming into general use belts or straps which may be passed around the body of the occupant of the motor vehicle seat and which are secured to some fixed part of the vehicle, so that in the event of a crash the occupant will not be thrown upwardly or forwardly or catapulted from the vehicle door if the latter should come open.

In addition to the proved desirability of providing belts which will hold the occupant of the motor vehicle seat against forward or side movement in the event of a crash, it is also desirable that such belts be constructed so that they can be easily secured and, more importantly, easily released so that if it should become necessary to remove a person from a vehicle seat after an accident, the belt can be removed quickly or, if the person is not knocked unconscious, he may be able to easily and quickly remove the belt himself.

In view of the foregoing, it is a particular object of the present invention to provide a new and novel belt or safety strap buckle for connecting together two ends of a safety strap, wherein the buckle is so designed that it can be closed to join the ends of the strap without requiring any special manipulation and wherein also the buckle can be opened easily and quickly to release the strap by one slight pull or a single movement of the hand grasping a portion of the buckle.

Another object of the invention is to provide a buckle having advantages of the character above set forth wherein means is provided which will prevent accidental opening of the buckle or separation of connected parts thereof.

Still another object of the invention is to provide a buckle of the above described character which is so designed that it can be quickly opened by rotating or turning an element thereof, but which will not open under strain or stress such as might be imposed thereon by any sudden movement of the body about which the belt, to which the buckle is attached, passes.

Still another object of the invention is to provide a belt buckle of the type described and having the above designed advantages, which is of relatively simple construction whereby it may be inexpensively produced but which at the same time can be made sufficiently rugged to withstand heavy strains to which it may be subjected in use.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view in plan of a belt buckle constructed in accordance with one embodiment of the present invention showing the connected portions or yokes thereof attached to the ends of two parts making up the safety strap;

Fig. 2 is a sectional view taken substantially on the line 2—2 of Fig. 1 showing the buckle parts in closed or coupled-together relation;

Fig. 3 is a view in side elevation of the buckle and portions of the attached parts of the strap;

Fig. 4 is a view in perspective of parts of one side or one half of the buckle structure in separated or exploded relationship, the tongue of the buckle being shown in fragment;

Fig. 5 is a sectional view corresponding to Fig. 2 but showing the tongue plate in open position to receive or release the jaw;

Fig. 6 is a plan view of another embodiment of the invention shown in closed condition and attached to ends of two portions of the safety strap;

Fig. 7 is a view of the underside of the embodiment shown in Fig. 6 with the parts of the buckle connected together;

Fig. 8 is a sectional view taken substantially on the line 8—8 of Fig. 6 and showing the buckle tongue open and in dotted outline;

Fig. 9 is a transverse section taken substantially on the line 9—9 of Fig. 8.

Referring now more particularly to the drawings, the description will be directed first to the embodiment of the invention illustrated in Figs. 1 to 4, wherein the buckle is designated as a whole by the reference character 10 and end portions of two straps connected to opposite halves of the buckle are designated 12 and 14.

As will be readily apparent to persons acquainted with the construction and manner of attaching safety belts or safety straps, the two strap portions 12 and 14 when used in a motor vehicle, for example, would have the opposite or outer ends secured to some fixed part of the vehicle structure such as any immovable part of the seat base or to anchors connected with parts of the vehicle chassis frame. In use, the other ends of the strap portions 12 and 14 are brought together around the waist of a passenger of the vehicle occupying a seat therein, and detachably coupled together by the buckle 10, or the second embodiment of the buckle shown in Fig. 6 and hereinafter more particularly referred to.

The buckle 10 comprises a first yoke portion which is generally designated 15 to which is shown attached the end of the strap 12. This yoke portion is generally of U-form and comprises the side arms 16 and a cross connecting two-part bar 17 which is formed in two overlapping parts 17a and 17b.

As shown in Fig. 4, the side arms 16 are each of substantial width and the bar portions 17a and 17b are each attached at one end to an end of an arm 16 which may be referred to as the outer end. Each of the arms 16 from its outer end is gradually increased in width through the major portion of its length and then decreases in width to a short rounded terminus or point 16a. In the area of maximum width each of the arms 16 has a transverse passage 18 therethrough.

The two parts of the bar 17, as previously stated, are designed to overlap and each part has a length which is only slightly less than the overall length of the bar and a thickness which is approximately half that of the complete bar, as will be readily apparent from Fig. 4, and in assembling the buckle yoke 15 when the parts 17a and 17b are overlapped, they are secured together by rivets 19 or in any other suitable manner.

Carried by the yoke 15 is a tongue plate which is generally designated 20 by means of which the locking together of the buckle parts and the unlocking or separation of the same is effected. This tongue plate in the form of the invention being described, is of relatively large size and approximately square in contour and has extending from one side a tail piece 21 the width of which is approximately equal to the space between the inner faces of the arms 16 of the yoke. This tail piece 21 of the tongue plate 20 is formed with a downwardly curving lip 22 which, as shown most clearly in Fig. 2, terminates in the reversely curved or upturned flange 23. This flange 23 joins a round rib portion 24 which extends the width of the flange 23 and the tongue 22 and projects beyond the opposite sides of the flange 23 and of the tongue 22 to form the oppositely extending pivot trunnions 25 which are of a diameter to enter the openings 18 of the yoke arms 16.

The trunnions 25 are entered the openings 18 in the assembly of the yoke 15 and after such assembly, which includes bringing the bar parts 17a and 17b into overlapping relation, the rivets 19 are applied so that the yoke 15 and the buckle tongue 20 with the associated parts described, are secured in assembled non-separable relation.

The underside of the tail piece 21 and of the tongue 22 into which the tail piece merges is curved or arched as indicated at 26 and the curvature of this arched part generally follows the curvature of the tongue and forms with the inner side of the flange 23 and the rib portion 24 an arcuate slot 27 in which is received a part of the opposite half of the buckle structure, which is hereinafter described.

Extending across the under face of the tail portion of the tongue is a rib 28 one side face of which forms a part of the arcuate surface 26 and this rib is in spaced relation with the rib 24 providing an entrance opening 29 for the hereinafter described coacting half of the buckle leading to the slot 27.

In addition to the rib 28 the tongue 20 has formed across its under face an abutment rib 20a which is spaced from the rib 28 and adjacent to the free end of the tongue plate for the purpose hereinafter described.

The numeral 30 generally designates the other half of the buckle structure with which the tongue and the yoke attached thereto cooperate. This part 30 might be defined generally as the jaw part and embodies a flat frame portion 31 having the outer bar 32, the short side bars 33 and a plate part 34 which is at the opposite side of the frame from the bar 32. The frame opening is designated 35.

Extending across the frame opening between the side bars 33 is a clamp bar which is generally designated 36 and which is preferably formed in two halves as shown in Fig. 2, which halves are designated 36a and 36b and lie one upon the other and are suitably secured together by riveting pins or the like 37. The end portions of the halves 36a and 36b of the clamp bar are recessed at their ends as indicated at 38 in Fig. 3 to extend over the upper and lower sides of the side bars 33 so that the clamp bar, about which the strap portion 14 is looped as shown in Figs. 2 and 3, can move within the frame opening 35 to clamp the strap 14 between one side of the bar 36 and the frame bar 32. The side of the clamp bar 36 which opposes the frame bar 32 is preferably roughened so that the strap will be firmly gripped and prevented from slipping.

The plate 34 has a width approximating the width of the tail piece 21 of the tongue 20 and is slightly downwardly slanted as indicated at 34a and then joins one side of a transversely curved or arcuate jaw 39 which is of a thickness to enter the keeper slot 27 through the entrance opening 29, when the tongue 20 is swung to the opened position in which it is shown in Fig. 5.

As will be readily apparent, when the tongue 20 is turned on its trunnions 25 to extend outwardly with respect to the yoke 15, the entrance opening 29 of the keeper slot will be directed upwardly. In this position of the tongue the jaw 39 can be readily introduced along the free edge thereof through the opening 29 and into the keeper slot and when the tongue 20 is then swung down to a position where it is substantially parallel with the plate 34 the jaw 39 will be locked down against the rib 24 so that the two parts of the buckle cannot separate.

In order to prevent the too easy opening of the tongue 20, a releasable fastener is provided between the tongue 20 and the plate 34. This fastener is generally designated 40 and is here illustrated as being of the type commonly known as a snap fastener such as is conventionally used on articles of clothing. In the present fastener construction, the button portion is designated 41 and is fixed to a rivet 42 which passes through the plate 34 so that the button lies on the outer face of the plate 34. The reference numeral 43 designates the socket portion which receives the button 41 and is secured against the underside or inner side of the tongue 20 by the rivet 44. This fastener 40 is located in the present illustration between the ribs 20a and 28 and as will be seen, when the tongue is in closed position where the two parts of the buckle are locked together, the fastener 40 will hold the tongue against accidental outward movement.

It will be understood, however, that the fastener 40 is of such character as to be sufficiently strong for the use to which it is put but will not be constructed so as to make it difficult for the wearer of the belt to swing the tongue to buckle opening position.

When the buckle is in closed position as shown in Figs. 2 and 3, the abutment rib 20a will engage against the adjacent part of the strap 14 to press it against the clamp bar 36. This will facilitate the holding of the clamp bar against sliding movement which might otherwise permit the strap portion 14 to slip.

In the illustration of the tongue in the open position according to Fig. 5, it will be seen that the swinging movement of the tongue is limited by the engagement of the shoulder portions 20b against the tops of the adjacent arms 16 forming a part of the U-shaped yoke 15. These shoulders are formed by the provision of the tail piece 21 of a width less than the width of the tongue 20 as will be readily obvious and in the engagement of the shoulders in the manner shown, the movement of the tongue beyond a desirable position is limited. When the tongue is in this open position to which it is limited by the shoulders engaging the side arms 16, the entrance 29 to the keeper slot will be most advantageously positioned to receive the jaw 39. Also it will be seen that due to the rounded surface formation of the rib 24, this will provide a smooth bearing surface for turning against the concave under surface of the jaw 39 so that the opening and closing of the tongue for the coupling together of the buckle parts or for uncoupling is most easily effected.

Figs. 6 to 9, inclusive, illustrate a second embodiment of the invention where the buckle is generally designated 50 and wherein it will be seen that a similar manner of effecting the connection between the buckle parts is employed. In this second embodiment the numeral 51 generally designates a substantially U-shaped yoke comprising the spaced side arms 52 and the cross connecting portion 53. As in the first embodiment, the portion 53 has secured therearound an end of one of the two straps forming part of the belt and which strap is designated 12a.

The arms 52 adjacent to their free ends are provided with bearing openings 54 corresponding to the openings 18 of the first embodiment, to receive the trunnion elements forming a part of the tongue structure as hereinafter described.

The numeral 55 generally designates the buckle tongue by which the opening and closing of the buckle is effected. In this second embodiment the tongue 55 is shown as being of a width approximating the width of the space between the arms 52 and one end of the tongue, corresponding to the tail piece 21, is shaped to have an approximately semi-cylindrical downwardly curving lip portion 56 which merges with an upturned flange portion 57 and which flange portion terminates in the transversely extending rib 58 which forms, like the rib 24, a circular head or bar. The ends of this rib 58 are extended beyond the sides of the tongue to provide the trunnions 59 and these trunnions are rotatably supported in the openings 54 of the yoke arms 52 between which the end of the tongue is positioned so that the tongue may rotate in the yoke on the axis of these trunnions 59 and the bar 58 as will be readily apparent.

As in the first described embodiment, the underside of the lip portion 56 is transversely arcuate and concave and the inner side of the flange portion 57 which is spaced from the arcuate inner surface of the lip 56, which surface is designated 60, forms a keeper slot 61 and an entrance opening 62 leading to the slot. This entrance opening is provided by the spacing between the rib 58 and the inner arcuate surface 60 of the lip, as will be readily seen upon reference to Fig. 8.

The body of the tongue 55 between the transversely rounded terminal lip portion 56 and the free end of the tongue is provided with a short slot 63 the long axis of which extends in the direction of the length of the tongue as shown in Fig. 6, and which slot forms a part of a releasable fastening means for the tongue when the latter is in closed position as hereafter described.

At its free end the tongue is tapered off slightly as shown in Fig. 8 at 64 and the underside of the tongue in this tapered portion merges with or forms one side face of the transverse abutment rib 65.

The numeral 66 generally designates the jaw part or jaw half of the buckle structure. This comprises a plate body 67 formed at one end to provide an open frame having the longitudinal side portions 68 and the cross connecting bar portion 69 forming an opening 70.

The plate 67 at the end remote from the frame part thereof is curved inwardly slightly as indicated at 71. This incurved part merges with the transversely extending and inwardly projecting rib 72 and terminates beyond the rib 72 in the transversely extending arcuate or substantially semi-circular jaw 73 which is of a thickness to be snugly received within the keeper slot 61 when the parts 51 and 66 of the buckle are joined together. As will be seen upon reference to Fig. 8, the outer surface of the jaw 73 is curved to substantially conform to the curvature of the inner or concave side surface 60 of the lip while the underside of the jaw 73 has a curvature designed to snugly receive the rounded surface of the rib 58. Thus the rib 58 will form a rounded bearing surface to turn against the underside of the jaw to facilitate the interlocking or separation of the jaw and lip parts.

The jaw part plate 67 has fixed therein a stud 74 which extends outwardly from the plate as shown in Fig. 8 and the outer end portion of this stud is enlarged to form a head 75 and this head is split in the longitudinal direction of the stud as indicated at 76 to form two parts which may be compressed or resiliently forced together and the overall width of the head is slightly greater than the width of the slot 63 so that when the tongue plate is swung down into closed position in the fastening together of the parts of the buckle, the split head will be forced into the opening 63 and a relatively tight fastening of the coupling will be effected between the tongue 55 and the plate 67.

The frame opening 70 has extended thereacross between the side portions 68 a clamp bar which is generally designated 77 and which corresponds in construction to the bar 36, being formed as shown in Fig. 9 in the two parts 80 which lie one upon the other and which are fastened together by pins 81. The portions 80 of the bar 77 at their outer ends are recessed or undercut so as to form slots 82 at the two ends of the bar 77 in which are received the side portions 68 of the frame. Thus the clamp bar has sliding movement on the frame sides 68 and the side of the bar 77 adjacent to the frame bar 69 is roughened or toothed as indicated at 83 to form a non-slipping surface between which and the adjacent side of the bar 69 can be clamped the strap part 14a which is adjustably looped over the clamp bar in the manner illustrated.

As in the previously described embodiment, the connecting together of the two parts of the buckle is effected by swinging the tongue 55 on its supporting trunnions 59 to the position in which it is shown in dotted outline in Fig. 8. In this position the entrance opening 62 leading to the keeper slot 61 will be directed outwardly and properly positioned for the easy reception of the edge of the jaw 73. This edge of the jaw is introduced into the entrance opening and placed to rest on the rounded rib 58 and when the tongue is then swung in toward the plate 67 or swung to closed position, the lip portion 56 will be rotated around the jaw 73 causing the latter to enter the keeper slot to the position shown in Fig. 8. When completely closed the tongue 55 will be more or less securely held by the stud head 75 which is engaged in the slot 63. Also the side of the rib 65 nearest to the clamp bar 77 will bear against a part of the strap 14a passing around the clamp bar and the clamp bar will be urged toward the adjacent frame bar 69 to effect a firm gripping of the strap as will be readily apparent.

From the foregoing it will be seen that there is provided by the invention in the embodiments described a buckle structure which is particularly well suited for use in association with safety straps to couple together the two strap portions since it is capable of firmly holding the ends of the straps together regardless of the amount of strain to which the straps of the buckle may be subjected while at the same time, by the provision of the novel rotating coupling between the lip portion of the tongue and the jaw associated therewith, the buckle can be opened quickly to release the connected ends of the straps if and when necessary. Also the arrangement of the connection between the two portions of the buckle is such that they can be brought together and interlocked by the user of the strap by feel alone and without the user having to see how the parts must be brought together. Thus the buckle can be easily and quickly closed in the dark to effect the desired joining of the strap parts and when closed the yieldable fastener between the buckle tongue and the jaw carrying plate will prevent the opening of the buckle by accident so that such opening may be effected only by the wearer deliberately pulling outwardly on the free end of the tongue to disengage the inter-connecting parts of the fastener.

I claim:

1. A buckle comprising a first part and a second part, said first part embodying a substantially U-shaped yoke having side arms and a cross connecting bar, an elongate substantially flat tongue including a tail portion, said tail portion terminating in a curved underturned lip and flange forming a keeper slot, said underturned lip and flange being positioned between said arms, means pivotally connecting the lip at its ends to the arms for facilitating turning of the tongue between the arms from an open position to a closed position, the keeper slot being disposed to open outwardly when the tongue is in open position, said second part embodying a plate having means for effecting attachment of a belt end thereto and a keeper jaw of a form to enter into the keeper slot by the turning of the tongue from open to closed position after placing the jaw in a prescribed position relative to the open tongue.

2. The invention according to claim 1, wherein said flange has a border rib of rounded cross section and the keeper jaw has an arcuate underside which receives said rib and on which it has turning bearing.

3. The invention according to claim 1, wherein said tongue in the major area thereof overlies and covers the major area of the said second part when the tongue is in said closed position.

4. A buckle comprising a first part, means for effecting attachment of an end of a belt thereto, a second part embodying a plate and a frame, a clamp bar in and extending across the frame and slidably connected at its ends to opposite sides of the frame for movement relative to a side of the frame, the bar being designed to have an end portion of a belt looped there-around, an elongate tongue pivotally coupled to the first part to assume a closed position relative to the second part in which it overlies said clamp bar, coacting means carried by the tongue and said plate by which coupling the two parts together and uncoupling the same is effected by turning movement of the tongue on its pivot, and means carried by the tongue whereby thrust is applied to the clamp bar when the parts are coupled together urging movement of the clamp bar toward a side of said frame.

5. The invention according to claim 4, wherein the last means comprises a rib carried by the tongue and having a side surface paralleling the clamp bar and by which said thrust is applied thereto.

6. The invention according to claim 4, with a friction latching means between the tongue and said plate for releasably connecting the tongue to the plate when the said coacting means are coupled together.

7. The invention according to claim 6, wherein said friction latching means comprises a snap fastener one part of which is upon the inner side of the tongue and the other part being upon the outer side of the plate.

8. The invention according to claim 6, wherein said friction latching means comprises a stud carried by the plate and projecting outwardly therefrom and having a split head and an opening in the tongue into which said split head is frictionally engaged.

9. A buckle comprising a yoke having two side portions and a cross bar therebetween, a tongue of substantial width and having a wide tail piece forming an extension of one end, the tail piece terminating in an under-turned curved lip forming an arcuate keeper slot extending across the width of the tail piece, pivot trunnions extending from the ends of the transverse edge of the lip, said tail piece being between said yoke side portions and said trunnions being pivotally joined to the side portions, a second plate having one end adapted for the attachment of a belt thereto and having an opposite end formed in an arcuate jaw adapted to be partly entered into the keeper slot when the tongue is turned on said trunnions to an opened position and the jaw thereafter being fully snugly entered into the keeper slot by the turning of the tongue to a closed position.

10. A buckle comprising two parts, means for facilitating the attachment of a belt to each part, an elongate tongue member pivotally attached at one end to one part, said tongue member having an outer side and an inner side, the tongue member having a curved recess across said one end upon the inner side thereof, the recess opening toward the other end of the tongue, and an arcuate jaw forming an end of the other part and embodying a recess extending across one side of said other part, each of said recesses having a bordering edge portion and the edge portion of each recess being seated in the other recess to form an interlocking coupling between said one end of the tongue and said other part when the buckle is closed, and the pivot axis for the tongue member extending longitudinally through the edge bordering portion of the tongue member recess, whereby the edge bordering portion of the tongue member recess when positioned in the jaw recess forms a bearing support for the arcuate jaw in the pivoting of the tongue member for opening and closing the buckle.

References Cited in the file of this patent

UNITED STATES PATENTS

| 352,532 | Fox et al. | Nov. 16, 1886 |
| 387,086 | Lum | July 31, 1888 |
| 1,303,652 | Girdler | May 13, 1919 |
| 2,105,480 | Hoffman | Jan. 18, 1938 |
| 2,458,810 | Varney et al. | Jan. 11, 1949 |
| 2,542,044 | Miller | Feb. 20, 1951 |

FOREIGN PATENTS

| 266,053 | Italy | July 17, 1929 |
| 791,479 | France | Sept. 30, 1935 |